US009400965B2

(12) United States Patent
Soffer et al.

(10) Patent No.: US 9,400,965 B2
(45) Date of Patent: Jul. 26, 2016

(54) PLATFORM FOR MODELING AND EMBEDDING BUSINESS SCENARIOS IN BAR CODES

(71) Applicants: Guy Soffer, Ra'Anana (IL); Michal Keidar, Herzeliya (IL)

(72) Inventors: Guy Soffer, Ra'Anana (IL); Michal Keidar, Herzeliya (IL)

(73) Assignee: SAP SE, Walldorf (DE)

( * ) Notice: Subject to any disclaimer, the term of this patent is extended or adjusted under 35 U.S.C. 154(b) by 251 days.

(21) Appl. No.: 13/898,640

(22) Filed: May 21, 2013

(65) Prior Publication Data
US 2014/0346225 A1    Nov. 27, 2014

(51) Int. Cl.
G06K 5/00      (2006.01)
G06Q 10/06     (2012.01)
G06F 17/30     (2006.01)

(52) U.S. Cl.
CPC .......... *G06Q 10/06316* (2013.01); *G06F 17/30* (2013.01); *G06Q 10/067* (2013.01)

(58) Field of Classification Search
None
See application file for complete search history.

(56) References Cited

U.S. PATENT DOCUMENTS

| 7,284,704 | B2 | 10/2007 | Lubow |
| 8,126,924 | B1* | 2/2012 | Herin .............................. 707/791 |
| 8,292,178 | B2 | 10/2012 | Chaves |
| 8,402,053 | B2 | 3/2013 | Roediger et al. |
| 8,620,021 | B2* | 12/2013 | Knudson et al. .............. 382/100 |
| 9,070,150 | B2* | 6/2015 | Pappas et al. |
| 2002/0077919 | A1* | 6/2002 | Lin ..................... G06Q 10/0875 705/26.81 |
| 2005/0011958 | A1 | 1/2005 | Fukasawa et al. |
| 2006/0161646 | A1* | 7/2006 | Chene et al. .................. 709/223 |
| 2007/0011334 | A1* | 1/2007 | Higgins et al. ................ 709/227 |
| 2010/0174974 | A1* | 7/2010 | Brisebois .............. G06F 17/243 715/223 |
| 2011/0000958 | A1 | 1/2011 | Herzig |
| 2012/0138679 | A1 | 6/2012 | Doyle |
| 2012/0206648 | A1 | 8/2012 | Casagrande et al. |
| 2012/0218470 | A1 | 8/2012 | Schaefer |
| 2012/0325902 | A1 | 12/2012 | Goyal et al. |
| 2013/0021364 | A1 | 1/2013 | Azuma et al. |
| 2013/0092730 | A1* | 4/2013 | Blinbaum ........ G06K 19/06009 235/375 |
| 2013/0112760 | A1 | 5/2013 | Schory et al. |
| 2013/0278622 | A1* | 10/2013 | Sun ........................ G06Q 20/22 345/589 |
| 2013/0291074 | A1 | 10/2013 | Dittrich |
| 2014/0061293 | A1* | 3/2014 | Jayaprakash et al. ......... 235/375 |
| 2014/0115708 | A1 | 4/2014 | Terwilliger et al. |

FOREIGN PATENT DOCUMENTS

CN       102402707 A    4/2012

* cited by examiner

*Primary Examiner* — Michael G Lee
*Assistant Examiner* — Tabitha Chedekel
(74) *Attorney, Agent, or Firm* — Buckley, Maschoff & Talwalkar LLC

(57) ABSTRACT

According to some embodiments, a business bar code application may execute at a mobile user device associated with a user. The user may initiate a capture of an image of a bar code, and responsive to said capturing, information about the user may be automatically fetched. Information associated with the bar code may be transmitted to a remote business bar code server. The business bar code server may automatically determine a business model associated with the received bar code information and interact with an enterprise system to execute a business process workflow for the user in accordance with the determined business model.

18 Claims, 19 Drawing Sheets

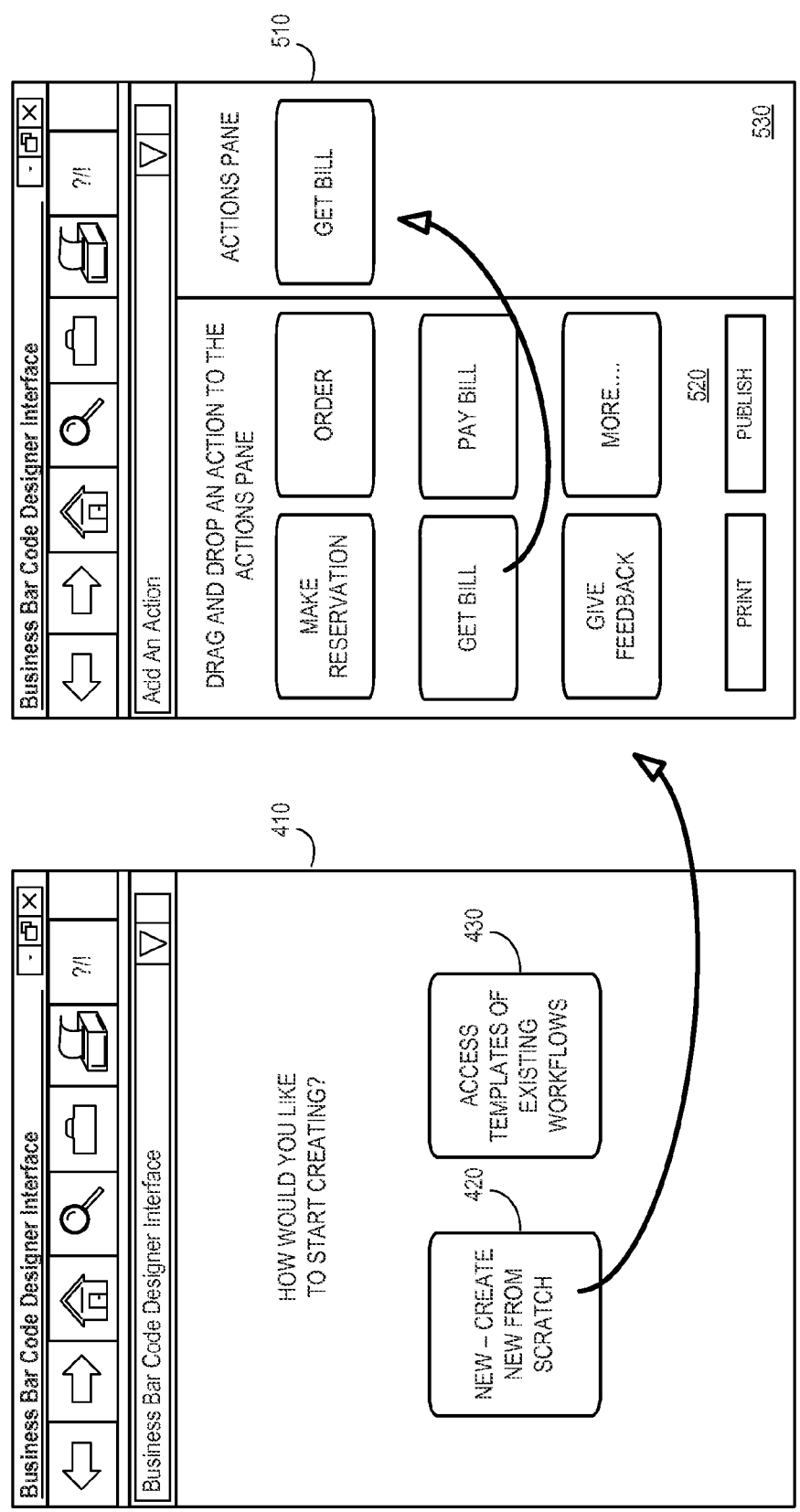

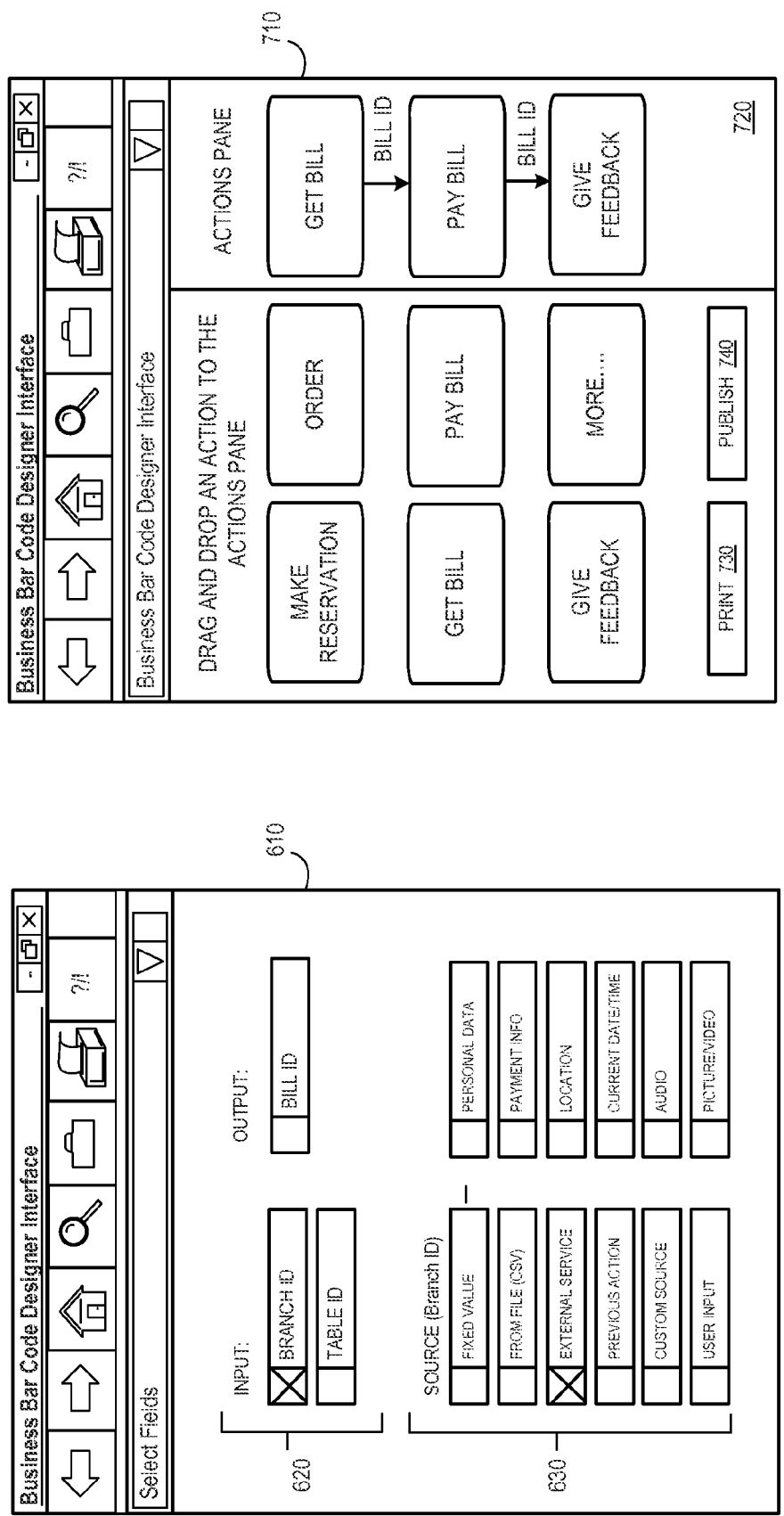

PLATFORM FOR MODELING AND EMBEDDING BUSINESS SCENARIOS IN BAR CODES

FIELD

Some embodiments relate to systems and methods associated with interactions between a user and a business platform. More specifically, some embodiments are directed to systems and methods to facilitate bar the use of codes in connection with interactions between a user and a business platform.

BACKGROUND

Bar codes can be used to direct people to web sites. For example, a user might take a picture of a Quick Response ("QR") code with his or her smartphone. The QR code may be mapped to a pre-determined static web page Uniform Resource Locator ("URL") address which may be automatically displayed in a browser application on the smartphone. By way of example, a user might take a picture of a QR code printed on a ketchup label and automatically be provided with coupons on a web page. In other cases, the QR code represents a dynamic URL address which is interpreted by a server that re-directs the user's browser to an appropriate web page.

Such an approach, however, has several disadvantages. Because the QR code is browser based and the URL is hidden from the user, it is possible that a user may be directed to a less than secure web address. Moreover, after the appropriate web page is displayed on the user's browser, he or she may need to manually provide additional information to a business platform (e.g., social network and/or payment information), which can be inconvenient and may prevent some users from using the code. Accordingly, methods and mechanisms to efficiently, accurately, and/or automatically facilitate interactions between a user and a business platform, such as an enterprise server, may be provided in accordance with some embodiments described herein.

SUMMARY

Some embodiments provide a system, method, program code and/or means to facilitate interactions between a user and a business platform, such as an enterprise server. According to some embodiments, a business bar code server receives information associated with a bar code from a remote mobile user device associated with a user. The business bar code server may automatically determine a business model associated with the received bar code information and interact with an enterprise system to execute a business process workflow for the user in accordance with the determined business model.

Other embodiments execute a business bar code application at a mobile user device associated with a user. A user initiates a capture of a bar code and, responsive to said capturing, the application may automatically fetch information about the user. Information associated with the bar code is then transmitted to a remote business bar code server.

In still other embodiments, information defining a business model to be associated with a bar code is received from a business bar code designer. The business model is then associated with a bar code identifier, and a bar code is created for the business model.

Some embodiments provide: means for receiving, at a business bar code server from a remote mobile user device associated with a user, information associated with a bar code; means for automatically determining, by a computer processor of the business bar code server, a business model associated with the received bar code information; and means for interacting with an enterprise system to execute a business process workflow for the user in accordance with the determined business model.

Other embodiments provide: means for executing, at a mobile user device associated with a user, a business bar code application; means for capturing an image of a bar code, said capturing being initiated by the user; responsive to said capturing, means for automatically fetching, by a computer processor of the mobile user device, information about the user; and means for transmitting, to a remote business bar code server, information associated with the bar code.

Still other embodiments provide: means for receiving, from a business bar code designer, information defining a business model to be associated with a bar code; means for associating the business model with a bar code identifier; and means for creating a bar code for the business model.

With these and other advantages and features that will become hereinafter apparent, further information may be obtained by reference to the following detailed description and appended claims, and to the figures attached hereto.

BRIEF DESCRIPTION OF THE DRAWINGS

FIGS. 4 through 7 illustrate graphical designer interface displays according to some embodiments.

DETAILED DESCRIPTION

Figure 1:
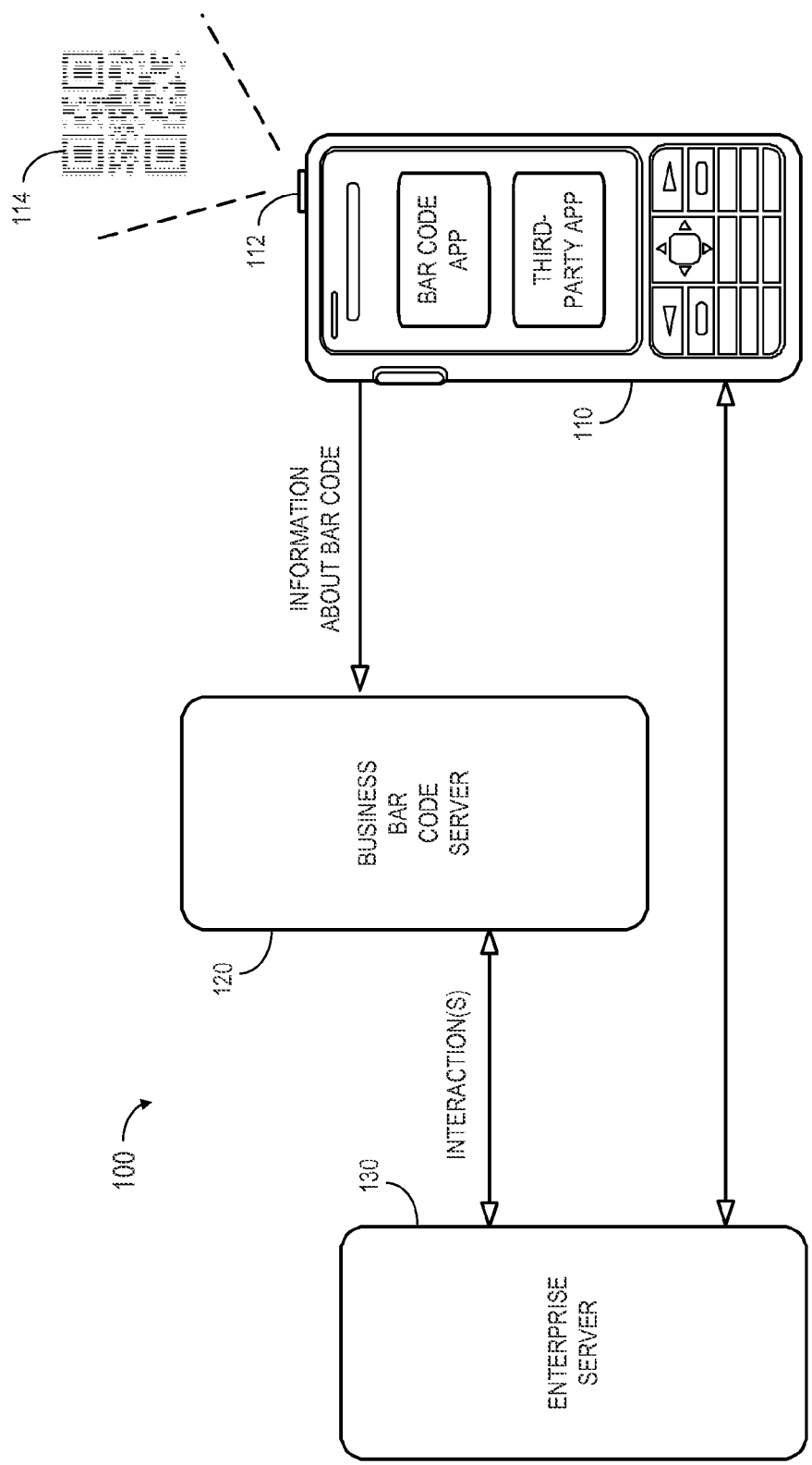
FIG. 1 is a block diagram of a system architecture according to some embodiments.

Bar codes, such as QR codes, can direct people to web sites. For example, a user might take a picture of a QR code with his or her smartphone. The QR code may be mapped to a pre-determined static web page URL address to be automatically displayed in a browser application on the smartphone. Because the QR code is browser based and the URL is hidden from the user, it is possible that a user may be directed to a less than secure web address. Moreover, after the appropriate web page is displayed on the user's browser, he or she may need to manually provide additional information to a business platform (e.g., social network and/or payment information). To address such problems, FIG. 1 is a block diagram of a system 100 according to some embodiments. The system 100 includes a mobile user device 110 that be used in connection with a business workflow, such as by purchasing an airline ticket or paying a restaurant check. The mobile user device 110 might be associated with, by ways of example only, a mobile computer, a smartphone, a gaming device, a navigation device, a music player, or a pair of eyeglasses having a lens based display. According to embodiments described herein, the mobile user device 110 includes a camera 112 that may capture an image of a bar code 114. Moreover, the mobile user device may execute a business bar code application, including a dedicated business bar code application, or a third-party application able to process business bar codes, that may fetch information about the user and transmit information about the bar code to a business bar code server 120. As will be described, the business bar code server 120 may interact with an enterprise server 130 to facilitate the execution of a business process scenario or workflow for the user.

The mobile user device 110 may in some embodiments also exchange business enterprise information with the enterprise server 130. By way of example only, the enterprise server 130 might be associated with an Enterprise Resource Planning (ERP) server, a business services gateway, a HyperText Transfer Protocol (HTTP) server, and/or an Advanced Business Application Programming (ABAP) server.

According to some embodiments, the enterprise server 130 may directly communicate with one or more remote mobile user devices 110 via the Internet. According to other embodiments, a gateway may be provided between the enterprise server 130 and the mobile user devices 110. The mobile user devices 110 may include one or more processors to receive electronic files and/or to execute applications and/or components (e.g., a plug-in that is integrated to a smartphone).

Note that FIG. 1 represents a logical architecture for the system 100 according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the devices illustrated in FIG. 1, including the enterprise server 130, business bar code server 120, and mobile user device 110, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

All systems and processes discussed herein may be embodied in program code stored on one or more computer-readable media. Such media may include, for example, a floppy disk, a CD-ROM, a DVD-ROM, magnetic tape, OR solid state Random Access Memory (RAM) or Read Only Memory (ROM) storage units. Embodiments are therefore not limited to any specific combination of hardware and software.

Figure 2:
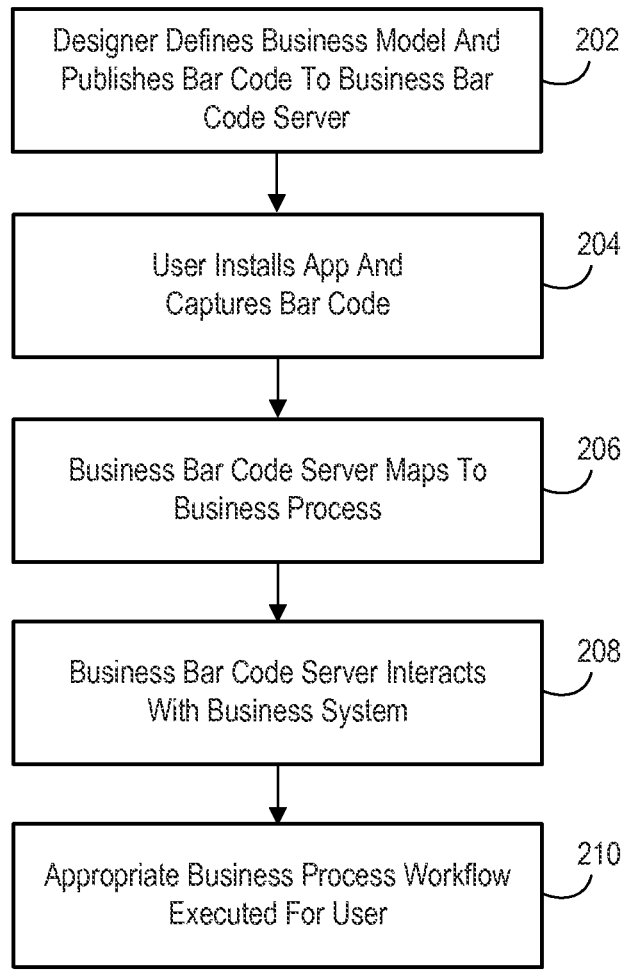
FIG. 2 is a flow diagram of an overall process in accordance with some embodiments.

According to some embodiments, the mobile user device 110 may facilitate the use of the bar code 114 to initiate a business process workflow. For example, FIG. 2 is a flow diagram of an overall process 200 that might be associated with the illustration of the system 100 of FIG. 1 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At 202, a designer defines a business model and publishes a bar code to a business bar code server. At 204, a user installs an application on his or her smartphone and captures an image of the bar code. The installed application automatically transmits information about the bar code to a remote business bar code server. According to some embodiments, the application also fetches information about the user (e.g., social network or payment information). At 206, the business bar code server maps the information about the bar code to the business process that was defined by the designer. At 208, the business bar code server interacts with a business system such that the appropriate business process workflow is executed for the user at 210.

Figure 3:
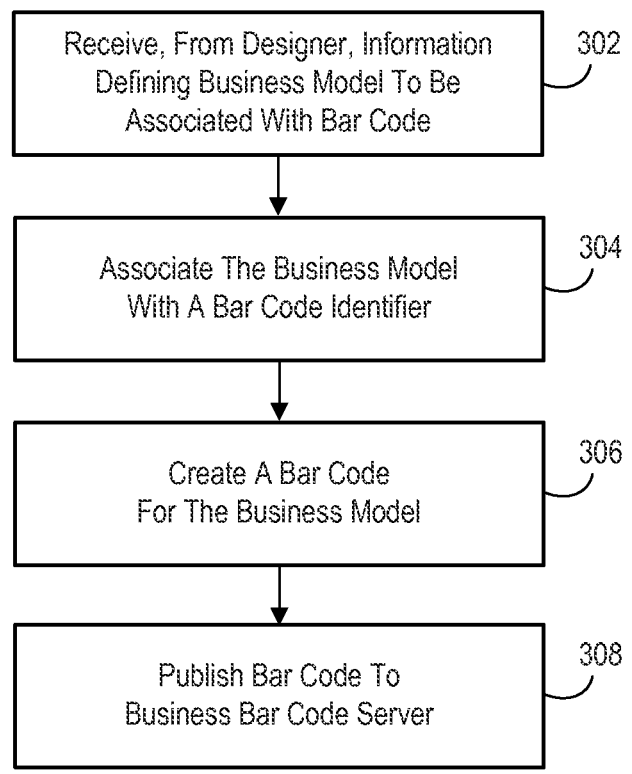
FIG. 3 is a flow diagram of designer method in accordance with some embodiments.

Thus, the initial step in the overall process involves the definition of a workflow by a designer. FIG. 3 is a flow diagram of designer method in accordance with some embodiments. At 302, information defining a business model to be associated with a bar code is received from a business bar code designer. According to some embodiments, this receiving is performed via a graphical designer interface. FIG. 4 illustrates a graphical designer interface display 410 according to some embodiments. In particular, the display 410 may let the designer create a new business model from scratch 420 or access a library of pre-defined business model templates of existing workflows 430. If the designer elects to create new business model 420, a display 510 such as the one illustrated in FIG. 5 may be provided. The display 510 includes a set of business model actions 520 that can be dragged by the designer and dropped into an actions pane 530.

The graphical designer interface may let the designer select input and output fields for each action in the actions pane 530. For example, FIG. 6 illustrates a display 610 that can be used by a designer to select inputs and/or outputs 620. Moreover, a source 630 can be defined by the designer (e.g., a fixed value or user input might be defined as the source for the action). When finished, a display 710 such as the one illustrated in FIG. 7 may include a final business workflow 720 of chained actions.

Referring again to FIG. 3, the business model is associated with a bar code identifier at 304, and at 306 a bar code is created for the business model. For example, FIG. 7 illustrates a "Print" icon 730 that a designer might select causing the designer application to print stickers that contain the bar code. At 308, the bar code is "published" to a business bar code server. For example, a "Publish" icon 740 might be selected by the designer causing the application to transmit information about the bar code, a bar code identifier, and/or the business process workflow to a remote bar code server.

Figure 9:
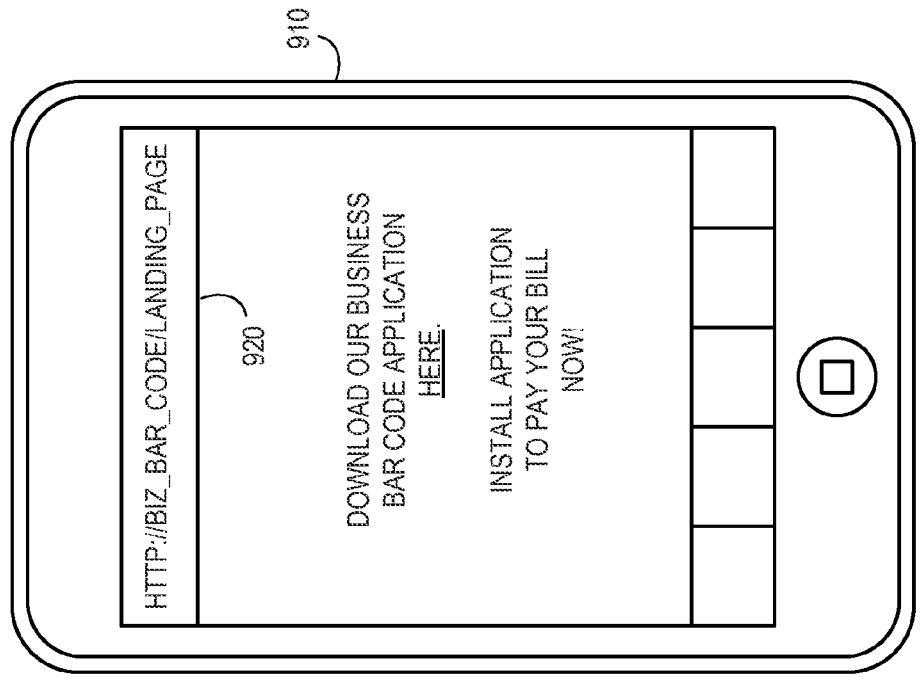
FIGS. 8 through 13 illustrate business bar code application installation displays in accordance with some embodiments.
Figure 8:
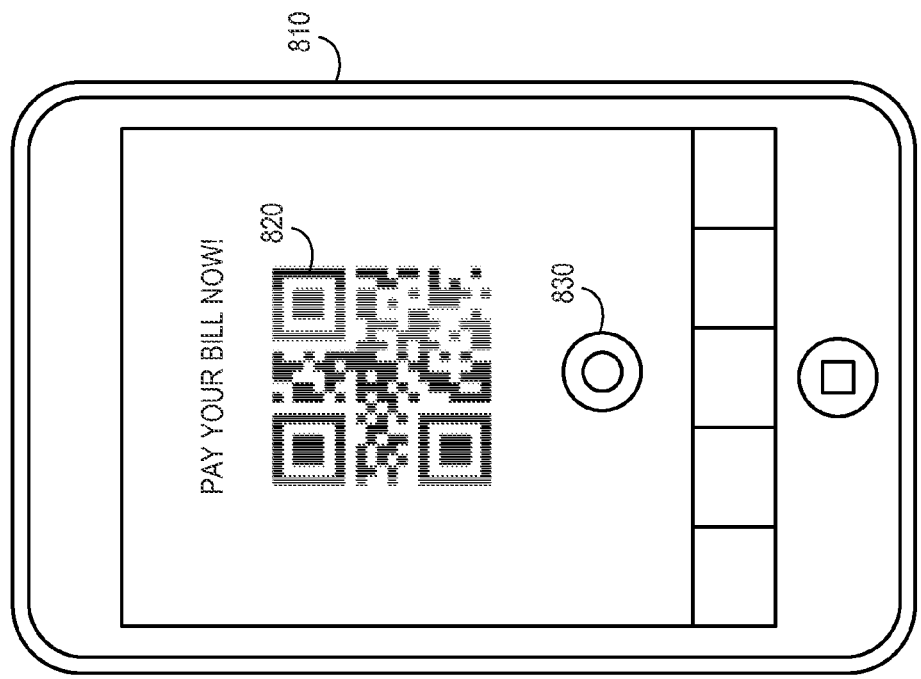
Figure 10:
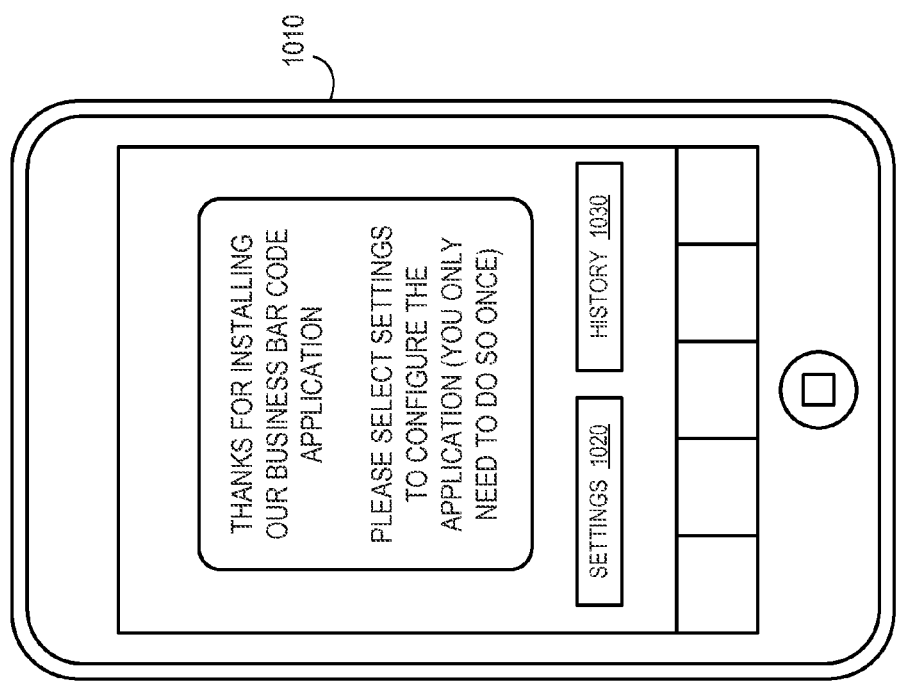

Referring to FIG. 8, a display 810 illustrates a user who has seen and taken a picture of a bar code 820 (e.g., via a touch screen shutter icon 830). Using typical QR code processing, the user is directed to a web page display 910 such as the one illustrated in FIG. 9 via a pre-defined URL web address 920. In particular, the display 910 asks the user to download and install a bar code application. Such a display 910 might only be provided if the business bar code application is not currently installed on his or her device. That is, if the business bar code application is currently installed the bar code 820 can be processed immediately without this intermediate step. Note that the bar code application might comprise a dedicated business bar code application or a third-party application written using a business bar code Software Development Kit ("SDK"). FIG. 10 is an example of a business bar code application display 1010 after it has been installed on a smartphone. The display may let the user customize settings 1020 and/or access a history 1030 (e.g., which may later contain a listing of prior bar codes that were utilized).

Figure 11:
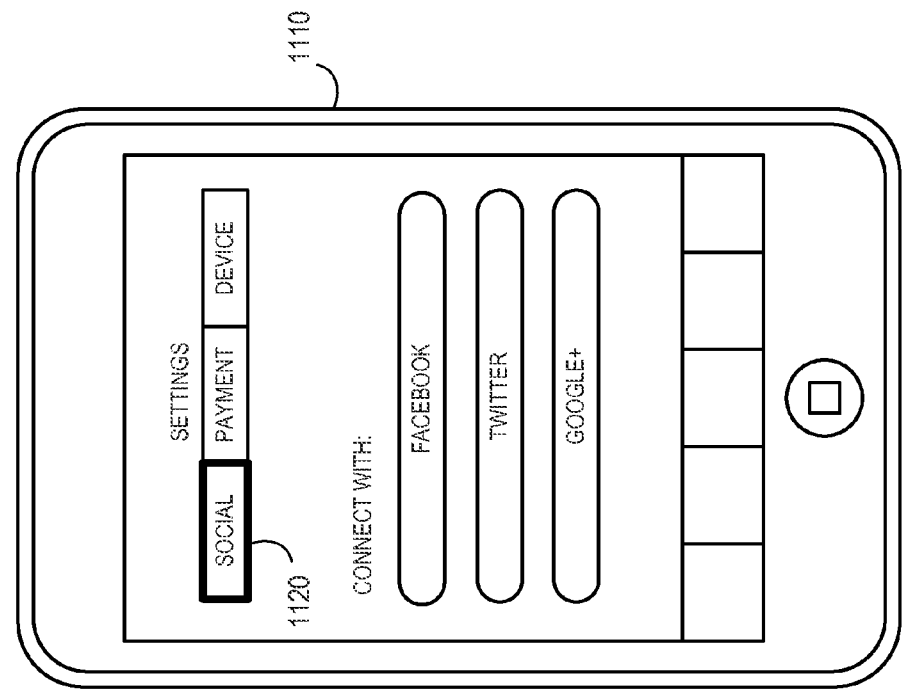
Figure 13:
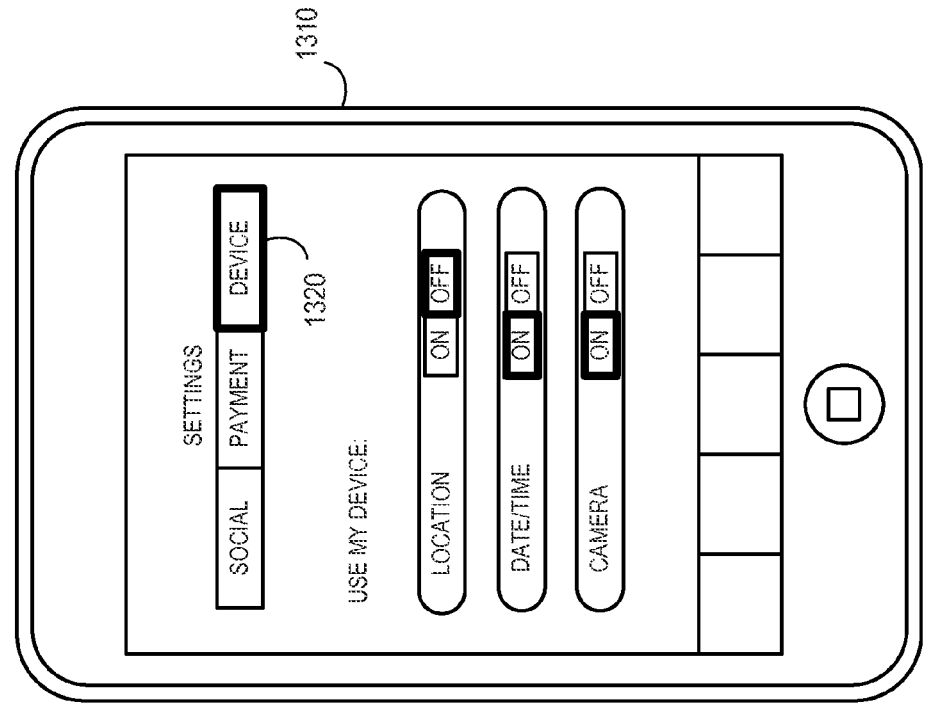
Figure 12:
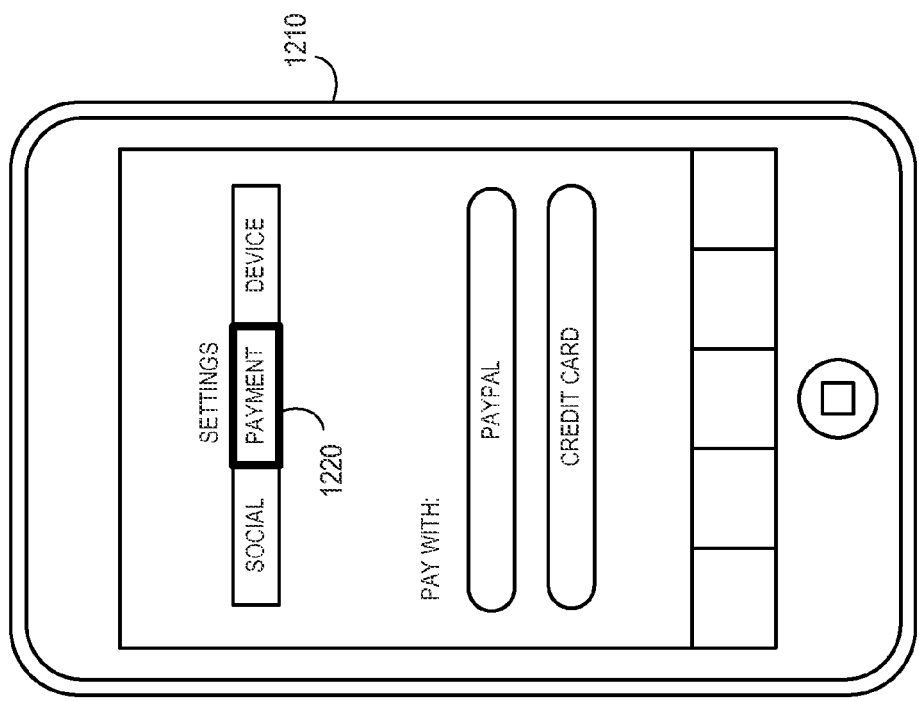

As illustrated in FIG. 11, customization of the settings 1020 may include a display 1110 wherein the user provides social network data 1120, such as by providing a Facebook account name and password. As illustrated in FIG. 12, customization of the settings 1020 may include a display 1210 wherein the user provides payment data 1120, such as by providing a credit card number and expiration date. As illustrated in FIG. 13, customization of the settings 1020 may include a display 1310 wherein the user provides permission to access device data 1320, such as smartphone's current location, the date and time, and/or camera information.

Figure 14:
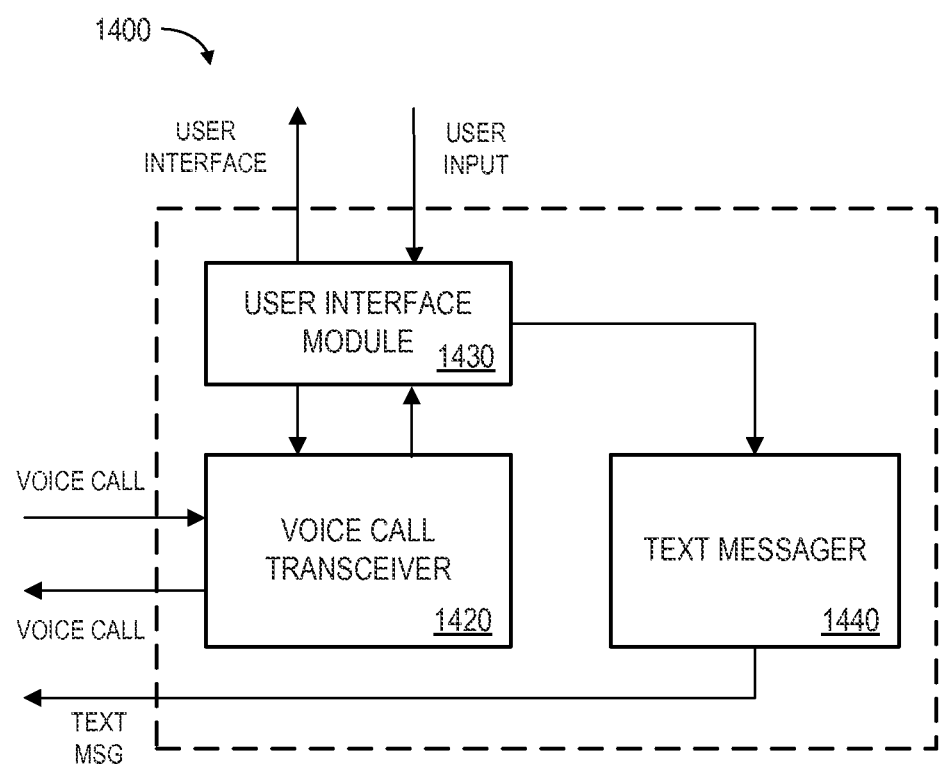
FIG. 14 is block diagram of a mobile communication device according to some embodiments.

Some embodiments of the present invention may be implemented via smartphones. For example, FIG. 14 is a block diagram of smartphone device 1400 according to some embodiments. Device 1400 may handle communication events (including voice calls and email messages) and facilitate interactions between a user and an enterprise application. Device 1400 may include functionality associated with different types of portable devices, including Personal Digital Assistants (PDAs), digital media players, digital cameras, wireless email devices, and any other device for receiving or transmitting various types of communications, such as voice calls, that is or becomes known.

The device 1400 includes voice call transceiver 1420, user interface module 1430, and text messager 1440. Each element of device 1400 may comprise any combination of hardware and/or software components suitable for providing the functions attributed thereto herein. Two or more of transceiver 1420, user interface module 1430, and text messager 1440 may share one or more constituent components, and, in some embodiments, device 1400 may include unshown elements for providing the functions described herein.

Voice call transceiver 1420 may receive and transmit voice calls via any suitable protocol. Voice call transceiver 1420 may also receive caller information associated with received voice calls. The caller information may comprise caller ID information and/or any other information that device 1400 may use to identify a party using the device and/or from whom a voice call is received (and such an identification may facilitate a speech to text conversion process).

A user input may be transmitted to voice call transceiver 1420 by user interface module 1430. In this regard, voice call transceiver 1420 may notify module 1430 of the reception of the voice call. User interface module 1430 may present a user interface to a user in response to the notification. The user interface may also facilitate interactions between a user and an enterprise application via the device 1400 and/or similar devices.

User interface module 1430 may also instruct text messager 1440 to transmit a text message. In response, text messager 1440 transmits a text message using a suitable text messaging service. The text messaging service may comprise any currently- or hereafter-known text messaging service. Conventional examples include IM, SMS, Multimedia Message Service ("MMS"), Enhanced Message Service ("EMS"), and electronic mail.

Communication history about business bar code server and/or enterprise system interactions handled by the voice call transceiver 1420 and/or text messages 1440 may be stored at the device 1400 and/or transmitted to a remote server. Moreover, such information may be provided to the user as appropriate via the user interface module 1430. As a result, some embodiments described herein may provide more efficient and enhanced communications between a user and a business bar code server and/or enterprise system than previously available. Although the device 1400 illustrated in FIG. 14 may be associated with a wireless telephone network, note that any of the embodiments described herein may be associated with other types of devices, including devices that exchange information (e.g., voice and data) via circuit switched or packet switched protocols (e.g., Internet Protocol ("IP") packets).

Figure 15:
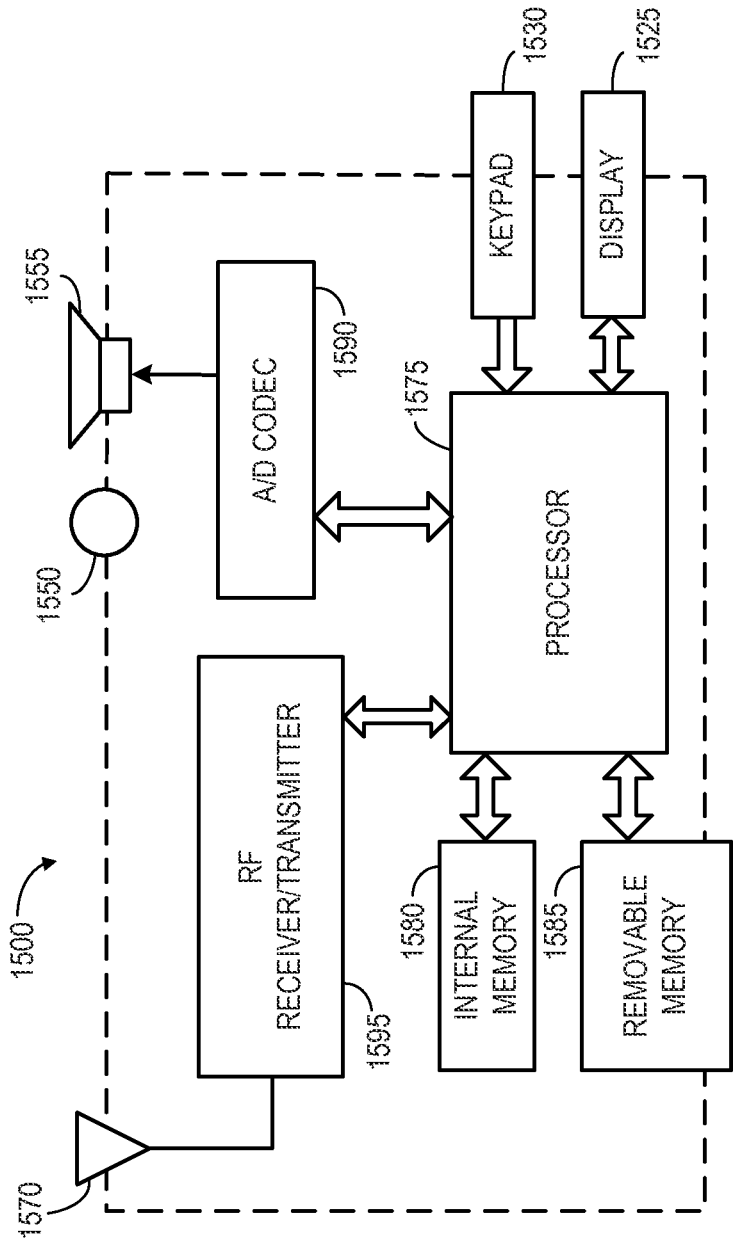
FIG. 15 is a block diagram of the internal architecture of a smartphone according to some embodiments.

FIG. 15 is a block diagram of the internal architecture of a smartphone 1500 according to some embodiments. As shown, the smartphone 1500 includes processor 1575, which may be a conventional microprocessor, microcontroller and/or Digital Signal Processor ("DSP") or other control circuit conventionally provided in a cellular telephone. Processor 1575 is shown in communication with keypad 1530 and display 1525 for control thereof.

Also included in the smartphone 1500 are internal memory 1580 and removable memory 1585. Internal memory 1580 may include one or more of Read Only Memory ("ROM"), Random Access Memory ("RAM"), e.g., static RAM), and flash memory. Removable memory 1585 may comprise a flash memory, a Subscriber Identity Module ("SIM") card or any other removable memory that is or becomes known. The smartphone 1500 may therefore be equipped with an interface for physically receiving and transferring data to and from removable memory 1585.

Note that a business bar code application might be stored in the internal memory 1580 and/or the removable memory 1585. Memories 1580 and 1585 may also store program code that is executable by processor 1575 to control the smartphone 1500. The program code may include but is not limited to operating system program code, application program code, device driver program code, and database connector program code. The program code may include code to cause smartphone 1500 to perform functions that are described herein. In some embodiments, the program code is executable to provide a voice call transceiver, a user interface module and a text messager as described with respect to FIG. 14.

Memories 1580 and 1585 may also store data used in the operation of smartphone 1500. Such data may include phone numbers, addresses, access codes, stored audio files, text corresponding to the stored audio files, bar codes that have been utilized, and other data. Some or all of the data may be read-only, while other of the data may be rewritable.

An analog/digital coder/decoder ("A/D codec") 1590 is also in communication with processor 1575. A/D codec 1590 may receive analog signals from a microphone (including speech input from a user), convert the analog signals to digital signals, and pass the digital signals to processor 1575. Conversely, processor 1575 may transmit digital signals to A/D codec 1590, which converts the digital signals to analog signals and passes the analog signals to speaker 1555. Speaker 1555 then emits sound based on the analog signals (including, according to some embodiments, speech output).

A Radio Frequency ("RF") receiver/transmitter 1595 is operatively coupled to antenna 1570. The RF receiver/transmitter 1595 may, in accordance with conventional practices, comprise a combination of two or more different receive/transmit modules (not separately shown) that operate in accordance with mutually different radio communication protocols to provide various services for the smartphone 1500. For example, receiver/transmitter 1595 may operate in accordance with one radio communication protocol to provide conventional two-way service for smartphone 1500, and may operate in accordance with another radio communication protocol to provide PoC service for smartphone 1500.

According to some embodiments, the smartphone further includes a camera 1550, such as a camera that is able to capture images of business bar codes.

Those in the art will understand that the block diagram of FIG. 15 is simplified in a number of ways. For example, all power and power management components of smartphone 1500 are omitted from the diagram. Also, some embodiments may employ an internal architecture somewhat different or completely different from that shown in FIG. 15.

Figure 16:
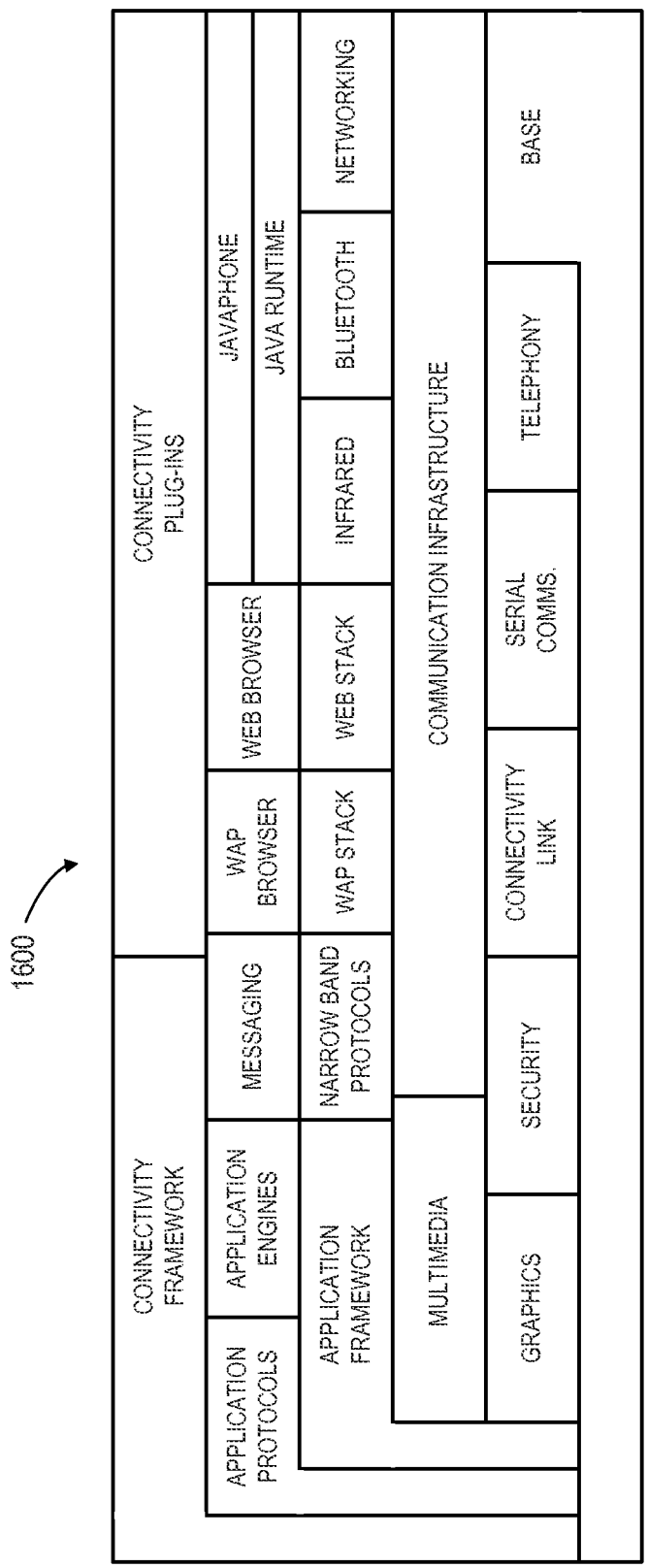
FIG. 16 is a block diagram of a smartphone operating system according to some embodiments.

FIG. 16 is a block diagram of an operating system architecture 1600 that may be used in conjunction with some embodiments. Architecture 1600 corresponds to the Symbian™ cellular telephone operating system but any suitable operating system may be used in conjunction with some embodiments, including those not intended and/or usable with cellular telephones. Suitable operating systems according to some embodiments include but are not limited to iOS™, Palm OS™, Windows Mobile™, RIM Blackberry™, and operating systems suitable for devices capable of transmitting text messages (e.g., PDAs and digital media players). According to some embodiments, the application engines portion of the architecture includes at least one engine to facilitate the utilization of business bar codes.

Figure 17:
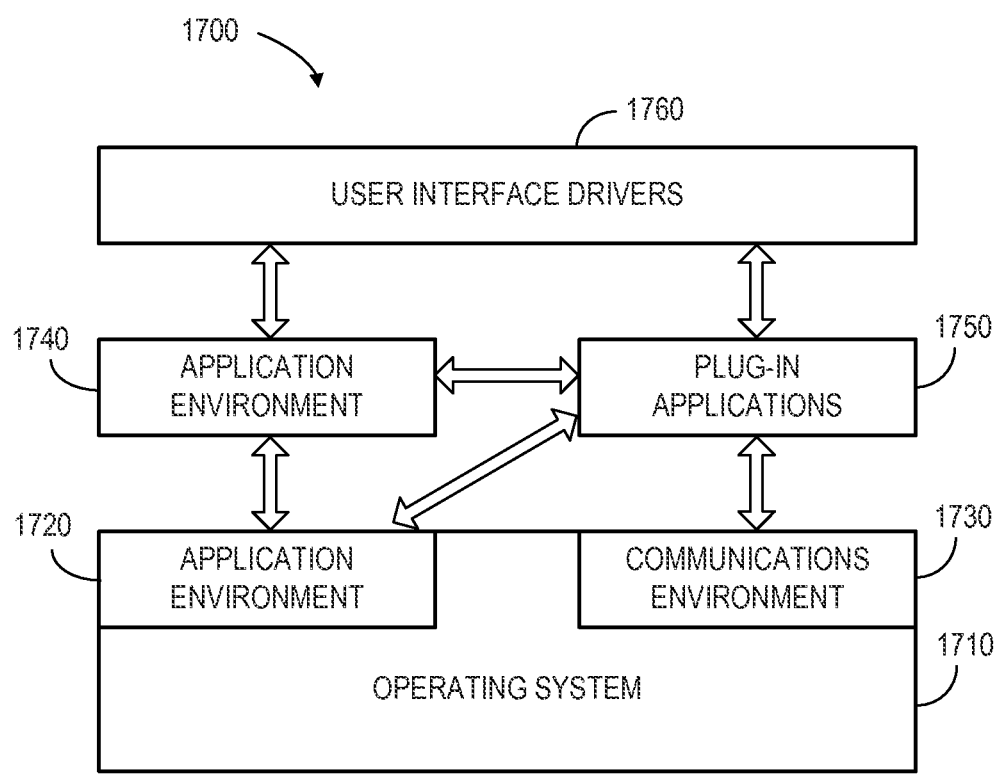
FIG. 17 is a block diagram of the software architecture of a smartphone according to some embodiments.

FIG. 17 is a block diagram of a general software architecture 1700 that may be used within a smartphone in conjunction with some embodiments. Architecture 1700 may operate to detect communication events initiated at or received by the telephone and facilitate interactions between a user and a business platform.

The architecture 1700 includes operating system 1710, which may comprise architecture 1600 of FIG. 16. In such a case, application environment 1720 and communications environment 1730 may correspond, respectively, to the connectivity framework and the connectivity plug-ins of architecture 1600. Generally, application environment 1720 provides a platform by which another application environment 1740 may interface with operating system 1710. The application environment 1740 may comprise a C, Java™ or any other programming environment. As such, plug-in applications 1750 may be written in Java or C for execution by cellular telephone. Plug-in applications 1750 may also be written for the application interface provided by application environment 1720.

A communications environment 1730 provides plug-in applications 1750 with access to the communications functionality of operating system 1710. This functionality may include text messaging, Web browsing and of course telephone communication. Plug-in applications 1750 may also transmit data and commands to and receive input from user interface drivers 1760 for control of the user interfaces of the smartphone.

Figure 18:
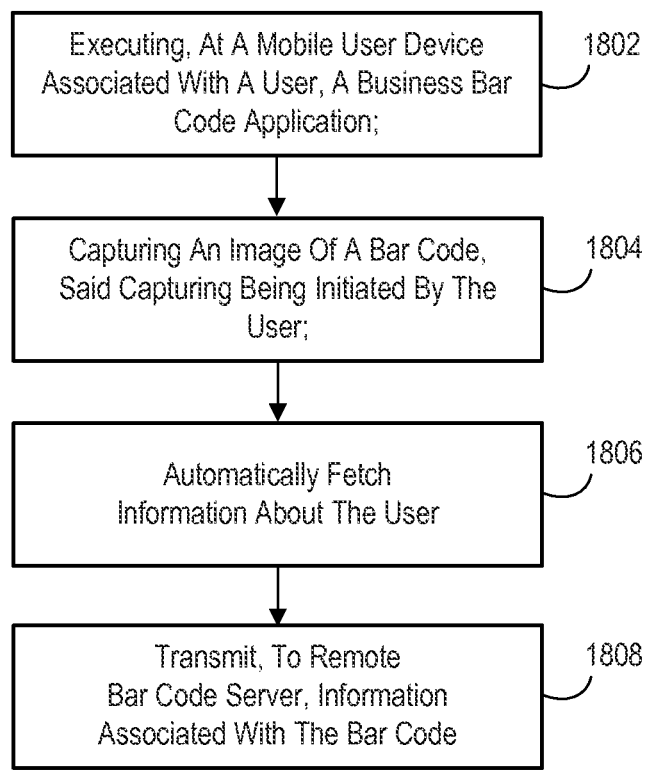
FIG. 18 is a flow diagram of a business bar code application method in accordance with some embodiments.
Figure 19:
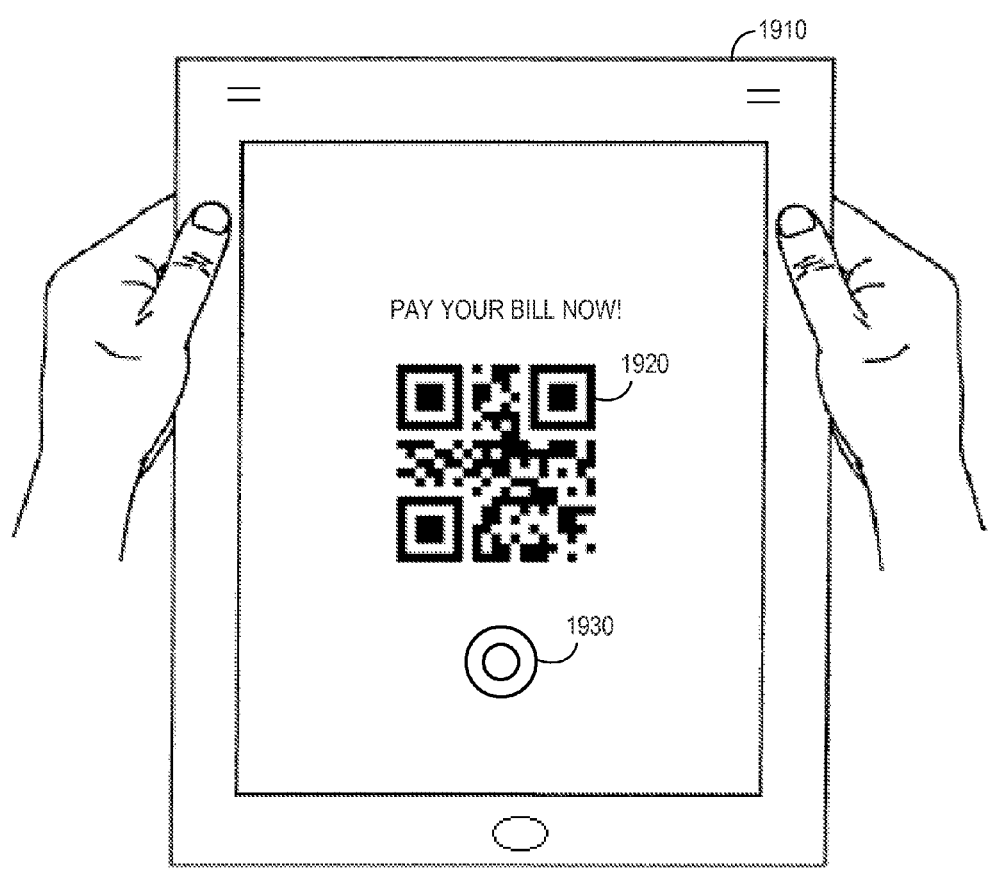
FIG. 19 illustrates a tablet computer business bar code display according to some embodiments.

According to some embodiments, an application executing in the application environment 1720 transmits and/or receives information in accordance with interactions between a user and a remote business bar code server and/or enterprise system. For example, FIG. 18 is a flow diagram of a business bar code application method in accordance with some embodiments. Note that the business bar code application may be independent of a smartphone's web browser. At 1802, a business bar code application may execute at a mobile device and a user may initiate a capture of an image of a bar code at 1804. For example, FIG. 19 illustrates a tablet computer business bar code display 1910 that might take a picture of a "bar code" 1920 using a camera shutter icon 1930 to facilitate payment of a restaurant check. As used herein, the phrase "bar code" may refer to a one-dimensional bar code, a two-dimensional bar or matrix code, a QR code, or any other optical machine-readable pattern.

Responsive to this capturing, information about the user may be automatically fetched at 1806. For example, the user's credit card number and Twitter account information may be fetched. Other information about the user that might be fetched includes: social networking data, user business data stored at a backend, payment information, a user location, time information, weather information, audio information, and/or image information (e.g., photographs or moving images). Information associated with the bar code, such as information including a bar code identifier and/or information about the user, may then be transmitted to a remote business bar code server at 1808.

Figure 20:
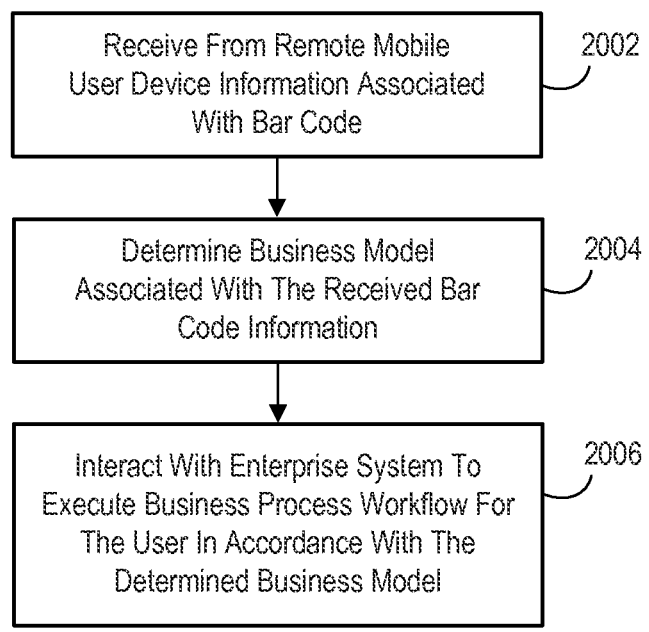
FIG. 20 is a flow diagram of a business bar code server method in accordance with some embodiments.

FIG. 20 is a flow diagram of a business bar code server method in accordance with some embodiments. At 2002, the business bar code server receives, from a remote mobile user device associated with a user, information associated with a bar code. The bar code server may then automatically determine a business model associated with the received bar code information at 2004.

The business bar code server may then, at 2006, interacting with an enterprise system to execute a business process workflow for the user in accordance with the determined business model. For example, a bar code identifier may be used to determine the business model based on the bar code information. Note that as used herein, an "enterprise system" may be associated with, for example, an Enterprise Resource Planning ("ERP") application, a Customer Relationship Management ("CRM") application, and/or an Advanced Business Application Programming ("ABAP") application.

Figure 21:
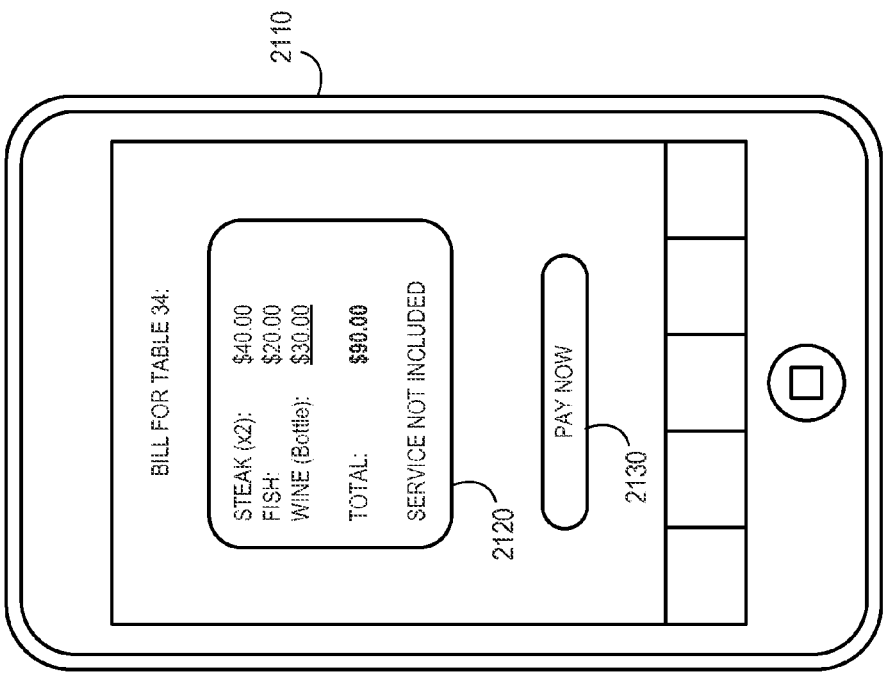

By way of example, after the user took a picture of the bar code of 1920 of FIG. 19 to facilitate payment of a restaurant check, the bar code server may have interacted with an enterprise system to arrange to shows the user a display 2110 such as the one illustrated in FIG. 21. The display includes an itemized description of the charges 2120 and includes a payment icon 2130 selectable to initiate a transfer of funds via the user's credit card number. Note that his or her credit card number might have been automatically fetched (and he or she does not need to enter the information after initiating the process). After payment, a display 2200 such as the one illustrated in FIG. 22 may be shown to the user, including an area to enter feedback comments 2220 and/or to provide those comments 2230.

Figure 23:
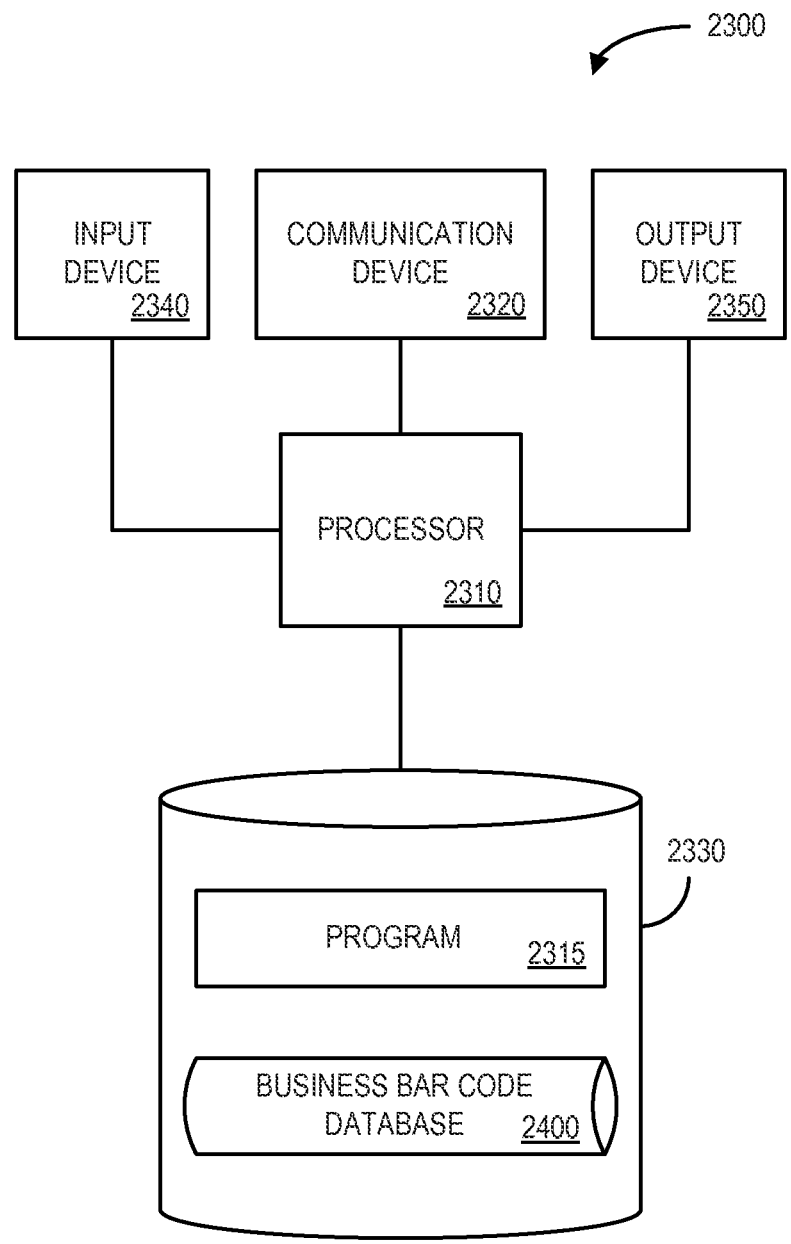
FIG. 23 is a block diagram of an apparatus according to some embodiments.

FIG. 23 is a block diagram overview of an apparatus 2300 according to some embodiments. The apparatus 2300 may be, for example, associated with a business bar code server, such as the server 120 of FIG. 1. The apparatus 2300 comprises a processor 2310, such as one or more commercially available Central Processing Units (CPUs) in the form of one-chip microprocessors, coupled to a communication device 2320 configured to communicate via a communication network (not shown in FIG. 23). The communication device 2320 may be used, for example, as an input path to receive information about bar codes from remote smartphones. The apparatus 2300 further includes an input device 2340 (e.g., to receive instructions from an operator or administrator) and an output device 2350 (e.g., a screen display to provide reports and usage information).

The processor 2310 communicates with a storage device 2330. The storage device 2330 may comprise any appropriate information storage device, including combinations of magnetic storage devices (e.g., a hard disk drive), optical storage devices, and/or semiconductor memory devices. The storage device 2330 stores a program 2315 for controlling the processor 2310. The processor 2310 performs instructions of the program 2315 and thereby operates in accordance with any of the embodiments described herein. For example, the processor 2310 may receive information about a bar code (e.g., a bar code identifier) and automatically determine a business model associated with the received bar code information. The processor 2310 may then interact with an enterprise system to execute a business process workflow for the user in accordance with the determined business model.

The program 2315 may be stored in a compressed, uncompiled and/or encrypted format. The program 2315 may furthermore include other program elements, such as an operating system, a database management system, and/or device drivers used by the processor 2310 to interface with peripheral devices.

As used herein, information may be "received" by or "transmitted" to, for example: (i) the apparatus 2300 from another device; or (ii) a software application or module within the apparatus 2300 from another software application, module, or any other source.

In some embodiments (such as shown in FIG. 23), the storage device 2330 further stores a business bar code database 2400 (e.g., including information about business bar codes). An example of a database that may be used in connection with the apparatus 2300 will now be described in detail with respect to FIG. 24. Note that the database described herein is only an example, and additional and/or different information may be stored therein. Moreover, various databases might be split or combined in accordance with any of the embodiments described herein.

Figure 24:
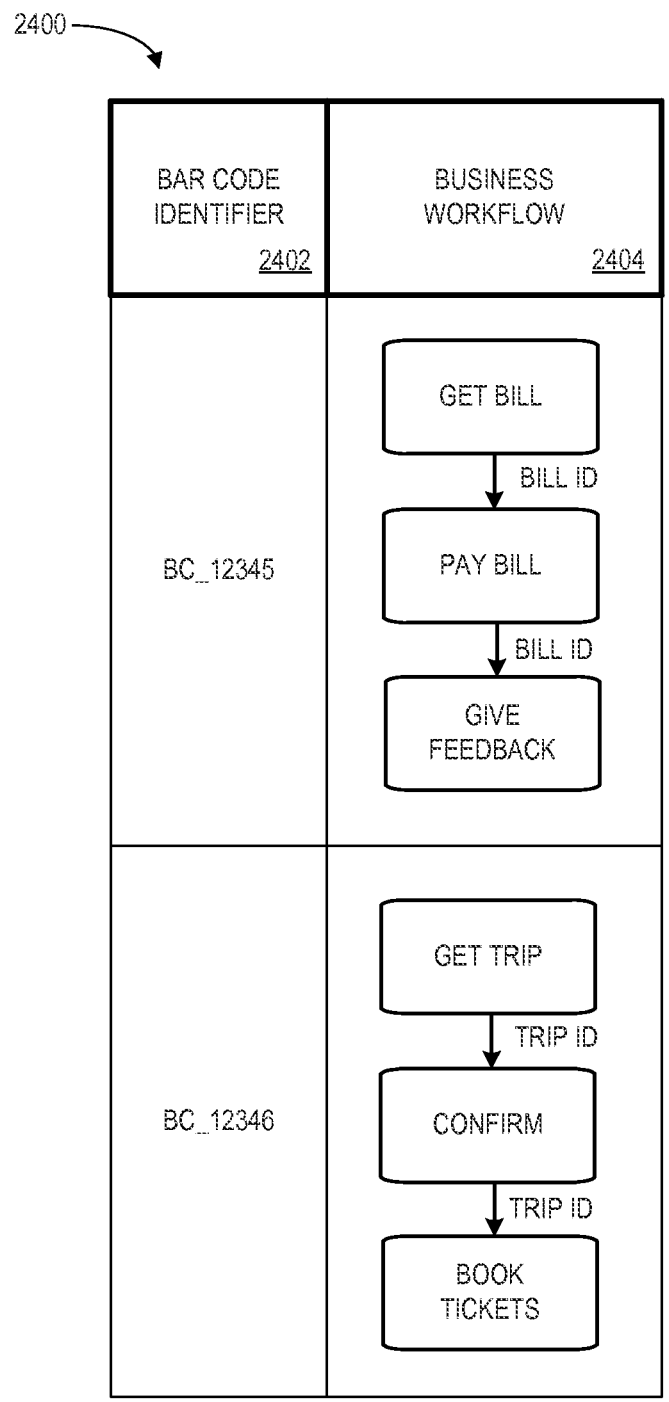
FIG. 24 illustrates a portion of a business bar code database that might be stored in accordance with some embodiments.

Referring to FIG. 24, a table is shown that represents the business bar code database 2400 that may be stored at the apparatus 2300 according to some embodiments. The table may include, for example, entries identifying business bar codes published by designers. The table may also define fields 2402, 2404 for each of the entries. The fields 2402, 2404 may, according to some embodiments, specify: a bar code identifier 2402 and a business process workflow 2404. The information in the map database 2400 may be created and updated, for example, based on information received from business bar code designers.

The enterprise information identifier 2402 may be, for example, a unique alphanumeric code identifying a business bar code. The business process workflow 2404 may represent a series of actions associated with an enterprise system. The business process workflow 2404 may, according to some embodiments, have been defined by a designer as described with respect to FIGS. 3 through 7 herein.

Figure 25:
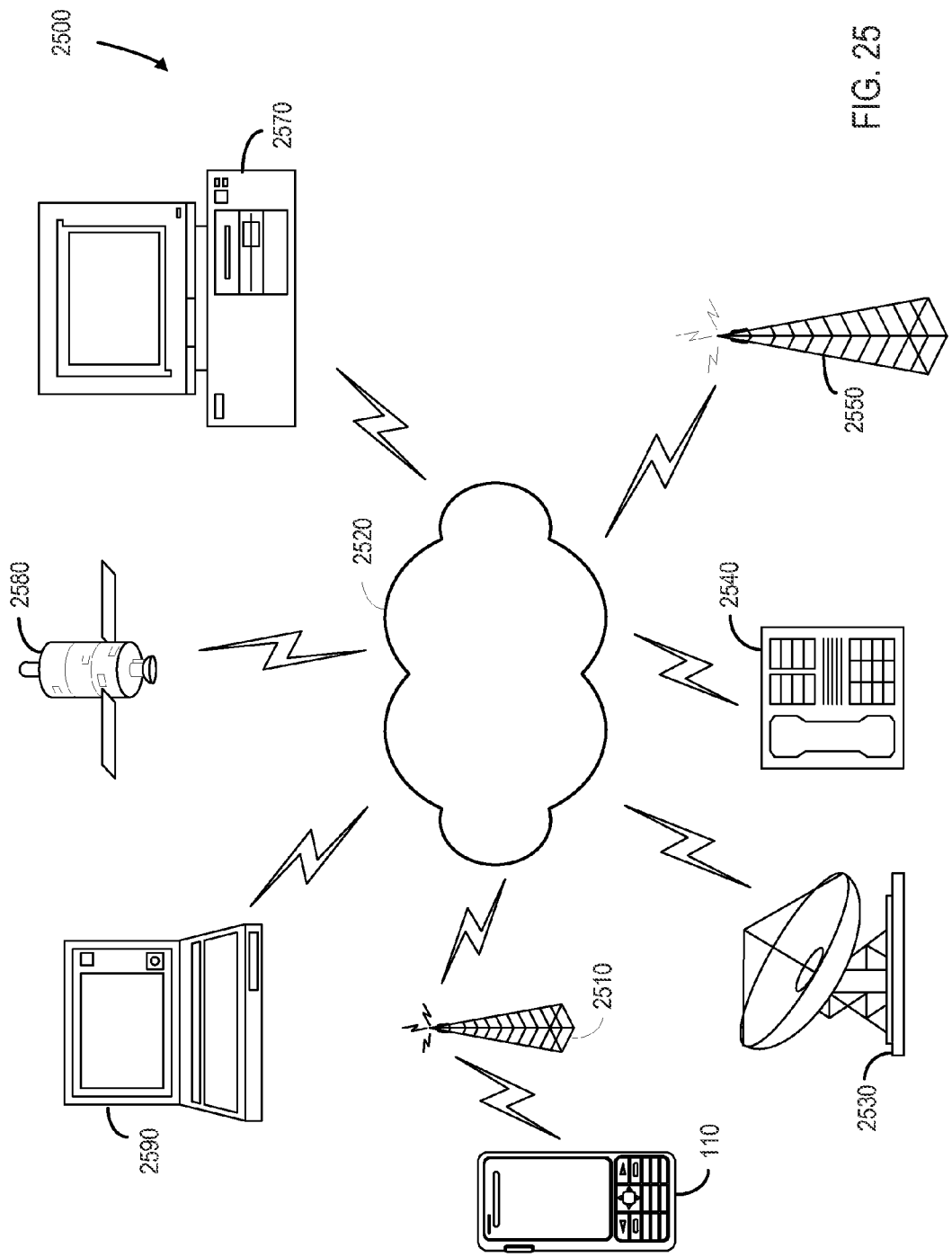
FIG. 25 is a diagram of a system architecture according to some embodiments.

FIG. 25 is a partial diagram of a communication architecture 2500 according to some embodiments. In particular, a mobile communication device 110 (in this example, a smartphone) is shown in communication with tower 2510, which may forward the transmission to communication network 2520 according to governing protocols. Communication network 2520 may include any number of devices and systems for transferring data, including but not limited to local area networks, wide area networks, telephone networks, cellular networks, fiber-optic networks, satellite networks, infra-red networks, RF networks, and any other type of networks which may be used to transmit information between devices. Additionally, data may be transmitted through communication network 2520 using one or more currently- or hereafter-known network protocols, including but not limited to Asynchronous Transfer Mode ("ATM"), IP, HTTP, and Wireless Application Protocol ("WAP").

The devices 2530 through 2590 are examples of some devices that may be a part of or in communication with communication network 2520. As such, devices 2530 through 2590 may receive communication events, either as intended recipients or as network nodes for passing messages. Devices 2530 through 2590 include satellite transmitter/receiver 2530, landline telephone 2540 having a subscriber line interface circuit to receive a telephone line (e.g., a cordless phone or a corded phone), communication tower 2550, desktop computer or server 2570, satellite 2580 and portable computing device 2590. Note the server 2570 might be associated with, for example, business bar code server. Any other suitable devices may be used as a transmitting device or a receiving device in conjunction with some embodiments.

The elements of system 2500 may be connected differently than as shown. For example, some or all of the elements may be connected directly to one another. Embodiments may include elements that are different from those shown. Moreover, although the illustrated communication links between the elements of system 2500 appear dedicated, each of the links may be shared by other elements. Elements shown and described as coupled or in communication with each other need not be constantly exchanging data. Rather, communication may be established when necessary and severed at other times or always available but rarely used to transmit data. According to some embodiments, business bar code information is transmitted from the mobile user device 110 to the remote business bar code server 2570.

Thus, some embodiments may establish methods and mechanisms to efficiently, accurately, and/or automatically facilitate utilization to bar codes in connection with interactions between a user and a remote enterprise system. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to business systems and databases, note that embodiments may be associated with other types of enterprise data. For example, interactions with financial, governmental, educational, and/or medical processes and systems may be facilitated in accordance with any of the embodiments described herein.

Moreover, while embodiments have been illustrated using particular types of tables and databases, embodiments may be implemented in any other of a number of different ways. For example, some embodiments might be associated with third-party and/or publically available information, such as flight or train schedules, stock prices, etc. available via web sites.

Figure 22:
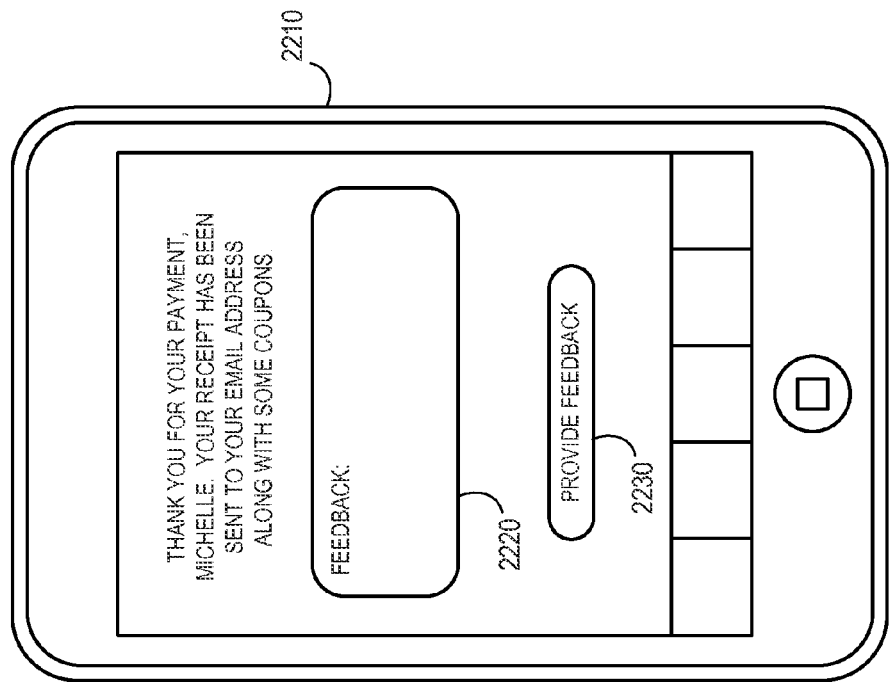
FIGS. 21 and 22 illustrate business bar code displays according to some embodiments.

Moreover, the description of paying a restaurant check provided in connection with FIGS. 21 and 22 is only one example of how business bar codes may be utilized. As another example, a user might take a picture of a bar code affixed to a second hand automobile and his or her information might be automatically transmitted to a seller. Another user might take a picture of a bar code on a bicycle and automatically receive details about that specific model along with a chance to purchase one (in which case, the bicycle owner might receive a reward for helping the sale). Other bar codes could subscribe people to distribution lists, provide notifications, make a restaurant reservation, book an airline ticket, exchange information at an employment recruitment fair, etc.

Further, although some embodiments are described as being implemented on a smartphone, note that a processing "cloud" may be used in accordance with any of the embodiments described herein. For example, a business bar code platform could be deployed in a cloud to facilitate interactions with any user or company in the world without needing to deploy it on particular servers. Moreover, a system might be regarded as a universal system which produces bar codes, such as QR codes, with universal unique identifiers and mapping of business workflows. Systems may even be integrated into existing unique barcodes. For example, a business workflow may be added to an existing legacy Universal Product Code ("UPC") of a product in the supermarket.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, comprising:
    receiving, at a business bar code server from a remote mobile user device associated with a user, information associated with a bar code;
    automatically determining, by a computer processor of the business bar code server, a business model based on the received bar code information, wherein the business model defines a business process workflow of chained actions for the user; and
    interacting with an enterprise system to execute the business process workflow of chained actions for the user in accordance with the determined business model;
    wherein the receiving of the information associated with the bar code is after the remote mobile user device captures an image of the bar code;
    wherein the executing of the business process workflow of chained actions for the user is after the automatically determining of the business model associated with the received bar code information; and
    wherein the business process workflow of chained actions utilizes information about the user that is: (i) stored in the remote mobile user device before said image of the bar code is captured by the remote mobile user device, and (ii) automatically fetched by a processor of the remote mobile user device after said image of the bar code is captured by the remote mobile user device; and
    wherein the business bar code server includes a database that identifies the chained actions and associates the series of chained actions with a bar code identifier associated with the bar code.

2. The method of claim 1, wherein the bar code comprises at least one of: (i) a one-dimensional bar code, (ii) a two-dimensional bar code, (iii) a matrix code, (iv) an optical machine-readable pattern, and (v) a Quick Response ("QR") code.

3. The method of claim 1, wherein the mobile user device is associated with at least one of: (i) a mobile computer, (ii) a smartphone, (iii) a gaming device, (iv) a navigation device, (v) a music player, and (vi) a pair of eyeglasses.

4. The method of claim 1, wherein said determining is associated with a bar code identifier.

5. The method of claim 1, wherein the business process workflow is associated with at least one of: (i) creating a business object, (ii) updating a business object, and (iii) deleting a business object.

6. The method of claim 1, wherein the business process workflow utilizes information about the user, including at least one of: (i) social networking data, (ii) user business data stored at a backend, (iii) payment information, (iv) a user location, (v) time information, (vi) weather information, (vii) audio information, and (viii) image information.

7. The method of claim 1, wherein the enterprise system is associated with at least one of: (i) an Enterprise Resource Planning application, (ii) a Customer Relationship Management application, or (iii) an Advanced Business Application Programming application.

8. A computer-implemented method, comprising:
    prompting, at a mobile user device associated with a user, the user to download a business bar code application;
    prompting, at the mobile user device, the user to select settings to configure the business bar code application;
    executing, at the mobile user device associated with a user, the business bar code application;
    capturing an image of a bar code, said capturing being initiated by the user;
    responsive to said capturing, automatically fetching, by a computer processor of the mobile user device, information about the user;
    transmitting, to a remote business bar code server, information associated with the bar code;
    transmitting, to the remote business bar code server, said information about the user; and
    receiving information associated with a business process workflow of chained actions for the user that is associated with a business model determined using the received bar code information wherein the business model defines the business process workflow of chained actions for the user,
    wherein said information about the user is stored in the mobile user device prior to said capturing of the image of the bar code.

9. The method of claim 8, wherein the information about the user comprises at least one of: (i) social networking data, (ii) user business data stored at a backend, (iii) payment information, (iv) a user location, (v) time information, (vi) weather information, (vii) audio information, and (viii) image information.

10. The method of claim 8, wherein the business bar code application is not a web browser.

11. The method of claim 8, further comprising prior to said executing:
    installing the business bar code application.

12. The method of claim 11, wherein said installing includes at least one of: (i) receiving permission from the user, (ii) receiving social networking information from the user, (iii) receiving default payment information from the user, (iv) and receiving configuration data from the user.

13. A non-transitory, computer-readable medium storing program code executable by a computer processor to perform a method, the method comprising:
    receiving, from a business bar code designer, information defining a business model to be associated with a bar code;
    associating the business model with a bar code identifier and a business process workflow of chained actions for a user; and
    creating a bar code for the business model;
    wherein said receiving is performed via a graphical designer interface;
    wherein the graphical designer interface lets the designer: (i) access business model templates, (ii) add a business model action, (iii) select input fields for a business model action, (iv) select output fields for a business model action, and (v) select a source for an action; and
    wherein the business model defines a plurality of chained actions to be executed for the user after the creating of the bar code for the business model.

14. The medium of claim 13, wherein the method further comprises:
    publishing the bar code to a business bar code server.

15. The medium of claim 13, wherein the business model is associated with at least one of: (i) a business bar code application, and (ii) a third-party application.

16. A mobile user device associated with a user, comprising:
    a camera to capture image information;
    a processor coupled to the communication port and configured to: (i) prompt, via a user interface, the user to download a business bar code application, (ii) prompt, via a user interface, the user to select settings to configure the business bar code application, (iii) execute the business bar code application, (ii) (iv) capture an image of a bar code via the camera, and (iii) (v) fetch information about the user;
    a communication port coupled to the processor to: (i) transmit information about the bar code to a remote bar code server and (ii) transmit said information about the user to the remote bar code server; and
    receive information associated with a business process workflow of chained actions for the user that is associated with a business model determined using the received bar code information wherein the business model defines the business process workflow of chained actions for the user,
    wherein said information about the user is stored in the mobile user device prior to said capture of the bar code via the camera.

17. The device of claim 16, wherein the bar code comprises at least one of: (i) a one-dimensional bar code, (ii) a two-dimensional bar code, (iii) a matrix code, (iv) an optical machine-readable pattern, and (v) a Quick Response ("QR") code.

18. The device of claim 16, wherein the device is associated with at least one of: (i) a mobile computer, (ii) a smartphone, (iii) a gaming device, (iv) a navigation device, (v) a music player, and (vi) a pair of eyeglasses.

* * * * *